(12) United States Patent
Kim et al.

(10) Patent No.: US 8,661,207 B2
(45) Date of Patent: Feb. 25, 2014

(54) METHOD AND APPARATUS FOR ASSIGNING A MEMORY TO MULTI-PROCESSING UNIT

(75) Inventors: Bup Joong Kim, Daejeon (KR); Hak Suh Kim, Daejeon (KR); Woo Young Choi, Daejeon (KR); Byung Jun Ahn, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 884 days.

(21) Appl. No.: 12/546,303

(22) Filed: Aug. 24, 2009

(65) Prior Publication Data

US 2010/0077193 A1    Mar. 25, 2010

(30) Foreign Application Priority Data

Sep. 24, 2008  (KR) .................. 10-2008-0093809

(51) Int. Cl.
*G06F 13/00*  (2006.01)
*G06F 13/28*  (2006.01)
*G06F 9/26*   (2006.01)
*G06F 9/34*   (2006.01)

(52) U.S. Cl.
USPC ..... 711/151; 711/154; 711/202; 711/E12.098

(58) Field of Classification Search
None
See application file for complete search history.

(56) References Cited

U.S. PATENT DOCUMENTS

| | | | |
|---|---|---|---|
| 5,123,101 A | | 6/1992 | Sindhu |
| 5,337,313 A | | 8/1994 | Buchholz et al. |
| 5,729,710 A | | 3/1998 | Magee et al. |
| 5,860,157 A | * | 1/1999 | Cobb .................. 711/103 |
| 6,266,751 B1 | * | 7/2001 | Niescier ............... 711/173 |
| 7,085,910 B2 | * | 8/2006 | Delaney et al. ......... 711/202 |
| 8,181,168 B1 | * | 5/2012 | Lee et al. .............. 717/149 |
| 2006/0282624 A1 | * | 12/2006 | Yokota ................. 711/147 |
| 2010/0070730 A1 | * | 3/2010 | Pop et al. .............. 711/167 |

FOREIGN PATENT DOCUMENTS

| | | |
|---|---|---|
| KR | 1994-7004097 A | 12/1994 |
| KR | 1998-034566 A  | 8/1998 |
| KR | 1020060053153 A | 5/2006 |
| KR | 1020060129329 A | 12/2006 |
| KR | 1020070061196 A | 6/2007 |
| KR | 1020070070121 A | 7/2007 |
| KR | 1020070074362 A | 7/2007 |
| KR | 1020080076484 A | 8/2008 |

OTHER PUBLICATIONS

"MPC8641D Integrated Host Processor Family Reference Manual" Supports MPC8641 MPC8641D; freescale semiconductor MPC8641DRM Rev. 0, Jul. 2006.

* cited by examiner

*Primary Examiner* — Reginald Bragdon
*Assistant Examiner* — Eric S Cardwell
(74) *Attorney, Agent, or Firm* — Ladas & Parry LLP

(57) ABSTRACT

A memory mapping apparatus for a multi-processing unit includes at least one memory matching unit configured to perform matching between a plurality of processing units and a plurality of memories, a memory controller configured to perform access control and arbitration for the respective memories, a memory mapping unit configured to include a window map for the respective processing units, make correspond the memories to the respective processing units with reference to the window map, and assign part of the entire address region of the corresponding memory, and a window map change unit configured to change a window map for a processing unit in which a request to use the memory has occurred in response to a request to use the memory from any one of the processing units.

9 Claims, 9 Drawing Sheets

(A)

(B)

| | 600 | 601 | 602 | 603 | 604 | 605 | 606 | 607 |
|---|---|---|---|---|---|---|---|---|
| | Channel | ID | SIZE | SPEED | LINKS | ACCESS | ERROR | The others |
| 608 | M0 | 0x0123 | 1GB | 1Gbps | 8 | 5423 | 0 | |
| 609 | M1 | 0x4545 | 1GB | 2.5Gbps | 4 | 234 | 1 | |
| 610 | M2 | 0xAA55 | 512MB | 2Gbps | 4 | 542321 | 0 | |
| 611 | M3 | 0x9876 | 1MB | 3.2Gbps | 2 | 9875 | 3 | |
| | ...... | ...... | ...... | ...... | ...... | ...... | ...... | ...... |
| 612 | Mn | 0xABCD | 256MB | 125Kbps | 3 | 8742 | 0 | | ns, thereby enabling several processing units to

METHOD AND APPARATUS FOR ASSIGNING A MEMORY TO MULTI-PROCESSING UNIT

CROSS-REFERENCE TO RELATED APPLICATION

This application claims the benefit of Korean Application No. 10-2008-0093809, filed on Sep. 24, 2008 in the Korean Intellectual Property Office, the disclosure of which is incorporated herein by reference.

BACKGROUND OF THE INVENTION

1. Field of the Invention

The present invention relates to a method and apparatus for assigning a memory to a multi-processing unit, which assigns memory to the multi-processing unit and changes assigned memory regions, thereby enabling several processing units to use independent and variable memory regions.

The present invention has been deduced from researches carried out as part of Packet-Broadband Convergence Switch Technology Development supported by Ministry of Information and Communication (MIC) and Institute for Information Technology Advancement (IITA) [Project Number: 2008-S-009-01, Title of the Project: Packet-Broadband Convergence Switch Technology Development].

2. Description of the Related Art

Generally, digital devices, such as a Personal Computer (PC), an embedded system, a network processing unit, and a portable device such as a mobile phone, include a micro processing unit, an audio processing unit, an Ethernet controller, a Graphic Processing Unit (GPU), and other various processing units.

The processing units require respective memories with various characteristics. A micro processing unit requires a memory having the largest memory capacity because it controls all digital devices, and a display processing unit or an Ethernet controller require a high-speed memory.

As described above, a variety of processing units built in digital devices include memories suitable for their characteristics, but the memories are not installed in the digital devices according to the number of the processing units. Digital devices are generally designed such that a main memory is shared by several processing units, for convenience of the design and production.

In this case, since several processing units share one memory address region, there is a problem that data corruption is generated for the memory region used by the processing units.

Further, in typical micro processor-based digital devices including processing units, there is a case where the location of an essential memory address region used by a micro processing unit in order to drive an Operating System (OS) and applications is fixed. In the case where defects occur in an address region where an operating system or a specific application is set to operate, which belongs to the memory address region, if the processing unit accesses the address region where the defects have occurred, the processing unit does not operates, so the entire system including the processing unit may stop.

In line with the recent emergence of a high-speed Input/Output (IO) interface, there is an increasing demand for the use of a system memory by a processing unit, provided in an apparatus coupled to the high-speed IO interface. Accordingly, a request for the use of the system memory by a main processing unit (a micro processing unit) and a request for the use of the system memory by the IO Input/Output interface may happen at the same time. Consequently, there is a need for a method of effectively distributing the use of a memory.

For example, when a device on the PCI side to which an Ethernet controller is connected sends an access request for a system memory, if a main processing unit accesses the system memory in order to drive an application, one of the main processing unit and the Ethernet controller must wait or cancel the access request for the system memory.

Meanwhile, in a processing unit in which both a general-purpose processing unit and a network processing unit are embedded, the general-purpose processing unit is generally configured to maintain and manages the entire system, whereas the network processing unit is generally configured to process network packets input or output through a network interface. The processing units performing different tasks as described above can generally have an optimized performance only when the types of memories used according to the characteristics of the tasks are classified. In this case, if several processing units share one memory, not only an optimal performance cannot be obtained, but the number of processing units sharing the memory increases. Accordingly, problems arise because the time that it takes to process the tasks is delayed, and address regions of a memory shared by the processing units may collide against each other.

SUMMARY OF THE INVENTION

It is, therefore, an object of the present invention to provide a method and apparatus for assigning a memory to a multi-processing unit, which assigns different memory address regions to respective processing units in a digital device having a plurality of processing units embedded.

Another object of the present invention is to provide a method and apparatus for assigning a memory to a multi-processing unit which assigns the address regions of a memory to respective processing units and assigns the address region of a processing unit (i.e., in an idle state) to a processing unit (i.e., in an active state).

Yet another object of the present invention is to provide a method and apparatus for assigning a memory to a multi-processing unit, which, when several memories are embedded in a digital device, performs a match for the memories to respective processing units with reference to the characteristics of the memories and the characteristics of the processing units.

Still yet another object of the present invention is to provide a method and apparatus for assigning a memory to a multi-processing unit, which is capable of partitioning the address region of a memory into a plurality of address regions so that corresponding processing units are driven in the respective partitioned address regions, distributing requests for the use of a memory, generated by processing units at the same time, minimizing the delay of a request for the use of a memory, and minimizing a problem that the use of a memory is stopped.

According to an embodiment of the present invention, there is provided a memory mapping apparatus for a multi-processing unit, including at least one memory matching unit configured to perform matching between a plurality of processing units and a plurality of memories, a memory controller configured to perform access control and arbitration for the respective memories, a memory mapping unit configured to include a window map for the respective processing units, make correspond the memories to the respective processing units with reference to the window map, and assign part of the entire address region of the corresponding memory, and a window map change unit configured to change a window map for a processing unit in which a request to use the memory has occurred in response to a request to use the memory from any one of the processing units.

According to another embodiment of the present invention, there is provided a memory mapping method for a multi-processing unit in a method of assigning memories to first and second processing units in a system comprising a first memory, a second memory, the first processing unit, and the second processing unit. The memory mapping method includes applying a window map for setting an access region of a memory to any one of the first memory and the second memory, and selecting any one of the first processing unit and the second processing unit, applying an access region set by the window map to a selected processing unit, and converting an address range of the access region into an address region accessible to the selected processor.

According to yet another embodiment of the present invention, there is provided a memory mapping apparatus for a multi-processing unit in a memory mapping system connected to a plurality of memories, a first processing unit, and a second processing unit. The memory mapping apparatus includes a window map storage unit configured to include a window map, and a memory mapping unit configured to make correspond any one of the plurality of memories to the respective first processing unit and the second processing unit with reference to the window map and map an address region of a matched memory.

According to the present invention, in a digital device including a plurality of processing units, the respective processing units is allowed to access only an address region assigned thereto, which belongs to the address regions of a memory. Accordingly, time delay, collision, and bottleneck phenomena which occur when respective processing units accesses a memory can be minimized.

In the method and apparatus for assigning a memory to a multi-processing unit in accordance with the present invention, respective processing units is connected to a memory suitable for its operating speed or performance and is then driven. Accordingly, the performance of the entire system on which processing units are mounted can be improved.

According to the present invention, when a plurality of processing units accesses one memory, different address regions of the memory are assigned to the respective processing units. Accordingly, there is an advantage in that the respective processing units seems to be connected to a dedicated memory and to be driven.

According to the present invention, since the address region of a memory, assigned to a processing unit (i.e., in an idle state), is assigned to a processing unit (i.e., in an active state), the memory can be effectively used.

BRIEF DESCRIPTION OF THE DRAWINGS

The above and other objects and features of the present invention will become apparent from the following description of some embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
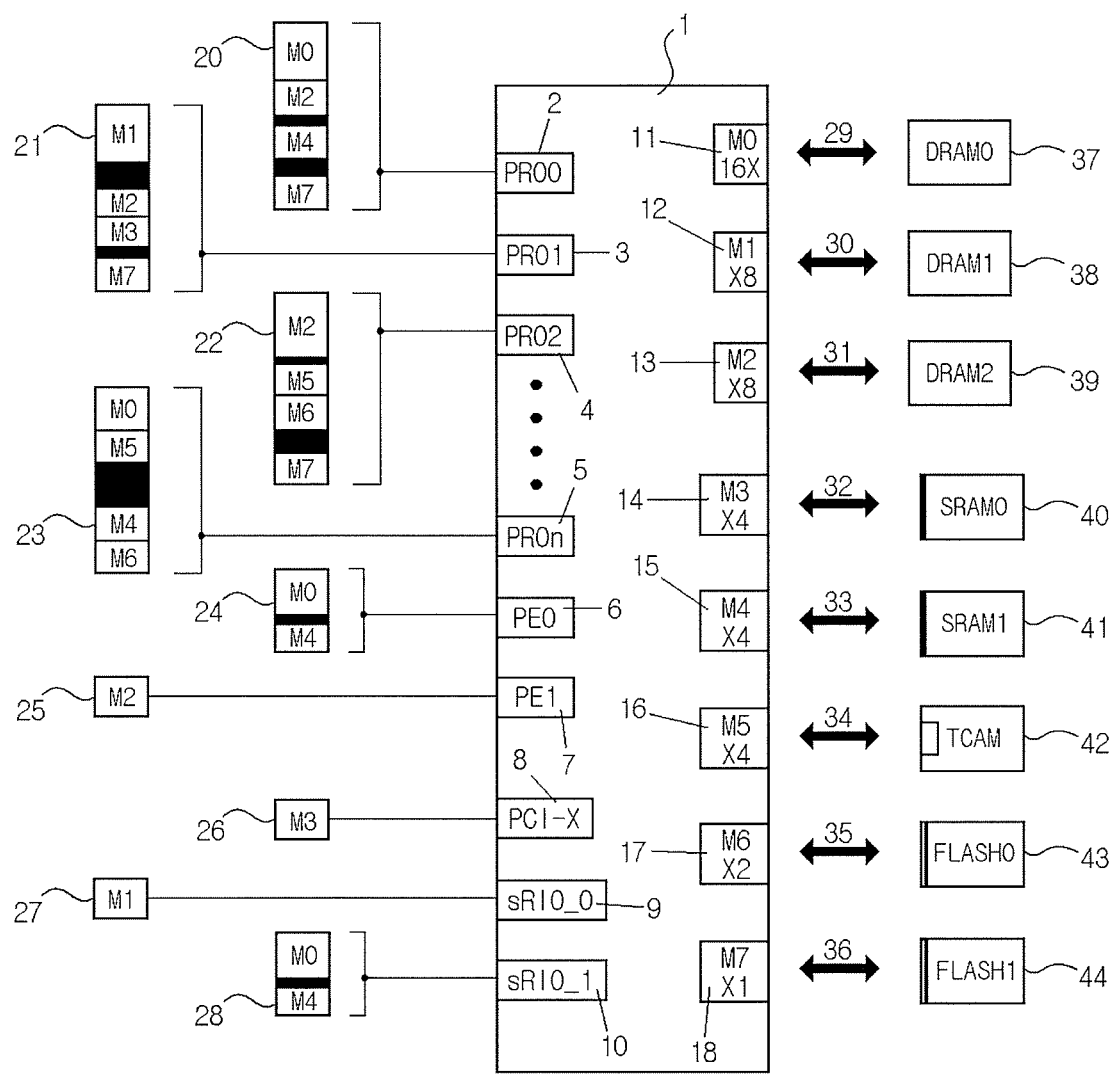
FIG. 1 is a conceptual block diagram showing a memory mapping apparatus according to an embodiment of the present invention.

FIG. 1 is a conceptual block diagram showing a memory mapping apparatus according to an embodiment of the present invention.

Referring to FIG. 1, the memory mapping apparatus 1 includes first processor matching units 2 to 5 configured to perform a match for one or more processing units, and memory matching units 11 to 18 configured to perform a match for a plurality of memories 37 to 44, such as DRAM, SRAM, TCAM, and FLASH.

The memory mapping apparatus 1 may be implemented in the form of a memory controller, which is configured to access and control a memory in computers, portable terminals (mobile phones, PDA), embedded devices, and other various electronic devices, or a chipset of a personal computer. Alternatively, the memory mapping apparatus 1 may be implemented in a Digital Signal Processor (DSP), Central Processing Unit (CPU), or a chipset.

The memory mapping apparatus 1 may further include a window map for determining whether one of the memories 37 to 44 will be assigned to which processing unit. Here, the window map may be implemented in the form of software, hardware logic, or a data file. The window map may be implemented to cooperatively operate with the operating system of a system, including the memory mapping apparatus according to the present invention, so that a plurality of processing units are selectively connected to the plurality of memories 37 to 44.

Here, the window map determines which processing unit will be connected to which one of the memories 37 to 44 based on the performance of the corresponding processing unit and the memory interface of the corresponding processing unit for the memories 37 to 44 and determines how much of a memory will be assigned to the respective processing units The window map is described below with reference to FIG. 2.

Figure 2:
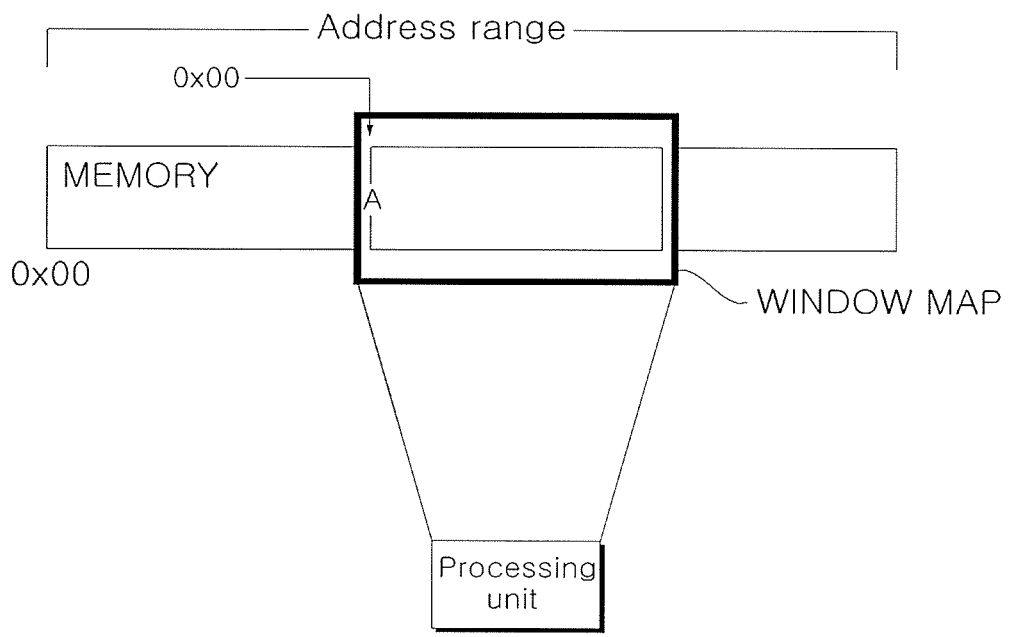
FIG. 2 is a conceptual view showing a window map according to the present invention.

FIG. 2 is a conceptual view showing a window map according to the present invention.

Referring to FIG. 2, the window map is a criterion on which a processing unit sets an accessible memory address range and a set address range is converted into an address range used by a processing unit. For example, if the start address of a memory and the start address of a processing unit are 0x00, the window map assigns an address region A of the entire address range of the memory to the processing unit and performs offset conversion of the start address of the region A into 0x00 (i.e., the start address of the processing unit). For the offset conversion, the memory mapping apparatus 1 may convert the start address of the region A into the start address of the processing unit with reference to the window map and extend the address by +1 from the start address of the region A.

Meanwhile, the memory mapping apparatus 1 may change the capacity of a memory or select another memory according to the state of a processing unit (for example, the capacity of a memory required by the processing unit and the type of data processed according to an application) or a characteristic in the task of an application with reference to the window map described with reference to the conceptual view of FIG. 2. This is described with reference to FIG. 3.

Figure 3:
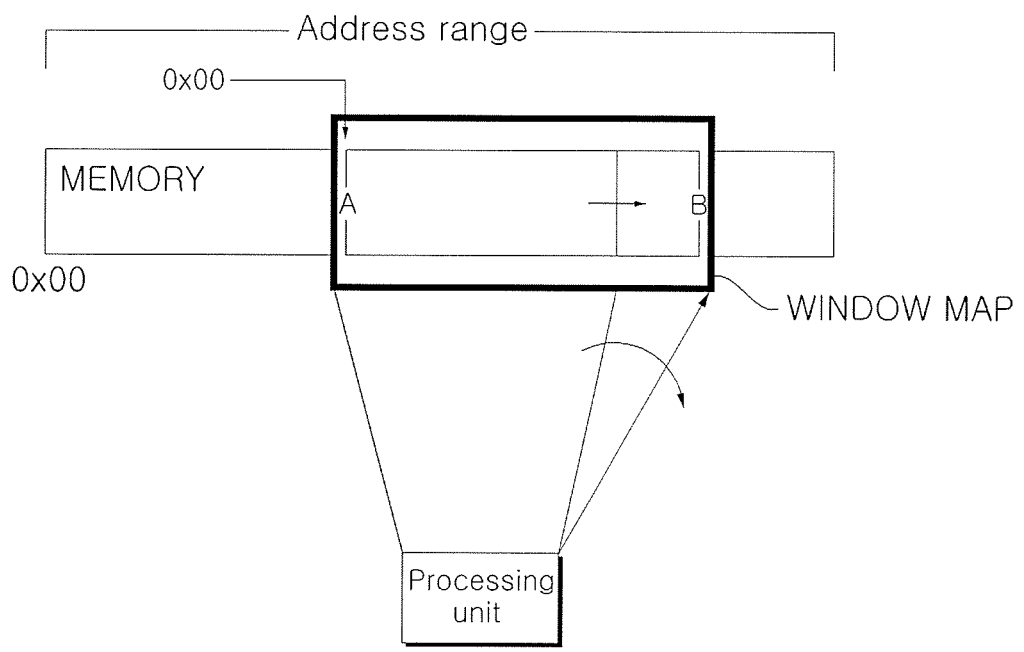
FIG. 3 is a conceptual view showing an example in which the address region of the window map varies.

FIG. 3 is a conceptual view showing an example in which the address region of the window map varies.

For example, when a processing unit performs a task requiring a high capacity of a memory, the memory mapping apparatus 1 may extend an address range by taking the capacity of the memory, required by the processing unit into consideration, so that an address region B of the memory is accessible to the processing unit. On the other hand, a window map change program for changing the window map may be installed in an operating system of a system in which processing units and a memory are installed according to information about the capacity of a memory, required by an application, for the capacity of a memory to be consumed by the application. Further, an address range of the window map may be changed according to the state of an application operating in an operating system using the variation program.

If a processing unit is placed in a local system or a place outside a system, the memory mapping apparatus 1 according to the present invention may provide both the systems with a memory mapping function. To this end, the memory mapping apparatus 1 includes second processor matching units 6 to 10 configured to perform a match for a processing unit (not shown) connected thereto through an external interface and the memory matching units 11 to 18 configured to perform a match for the memories 37 to 44 connected to a memory match port. The memory mapping apparatus 1 arbitrates the input and output of data between the processing unit and the memories. Applications operating in the processing unit fetch software codes and store data using a memory existing on the address space of a processing unit. In the case in which, in an environment in which one or more processing units and one or more memories exist, the respective processing units drives an application in a predetermined address region, they may experience great restriction in performing respective tasks and driving respective pieces of software. In particular, if an interrupt occurs in a system including a processing unit, the system enables a main processing unit to process an interrupt service with reference to a predetermined address region according to an interrupt service routine call.

In order to support a distributed interrupt processing in a multi-processor environment, the respective processors must have a memory map which is independent in terms of hardware. Further, the type of a memory, the prices according to the types and capacities of memories, the operating speed and processing speed of a memory according to the type of a memory, and the type and capacity of a memory required according to the characteristic of data and a task processed by a processing unit differ are different. In an environment in which one or more memory match functions are supported, the tasks of processors are classified on a memory basis. Accordingly, the memory map of a processing unit performing a task requiring a high performance is matched with a memory suitable for the high performance, and the memory map of a processing unit performing a low-speed and repetitive task is matched with a low-speed or low-capacity memory. Accordingly, an overall task processing efficiency of a system including a plurality of processing units can be maximized and processing expenses thereof can be reduced. Further, a processing unit may register the entire one memory with its memory map or register some of a memory with its memory map. Accordingly, an access region accessible to one processing unit does not overlap other processing units because the processing units share one memory. Consequently, data corruption occurring when processing units access the same memory region can be prevented.

According to the present invention, processing units are allowed to configure respective independent and variable memory maps 20 to 28, as shown in FIG. 1. Consequently, in a system environment including the plurality of processing units and the plurality of memories, the utilization of processing and memory resources can be enhanced. Meanwhile, it is illustrated that some of memory interfaces 29 to 36, provided between the respective memories 37 to 44, shown in FIG. 1, and the memory mapping apparatus 1 are the same and some of the memory interfaces 29 to 36 have different types. However, a method of configuring the memory interface 37 to 44 may also be implemented by using interfaces specialized according to the respective memories 37 to 44 using the same interface for memories having similar operating speeds and performances, or integrating interfaces for the respective memories 37 to 44 in a chip according to the design rule of a system including a plurality of processing units and memories.

FIG. 4A is a conceptual view showing a method of offsetting addresses assigned by the window map.

In the case where one memory is partitioned into a plurality of address regions and the partitioned address regions are assigned to respective processing units, the start addresses of the partitioned address regions are not generally identical to those of the processing units.

In general, a processing unit operates on the basis of the start address of a memory.

Figure 4:
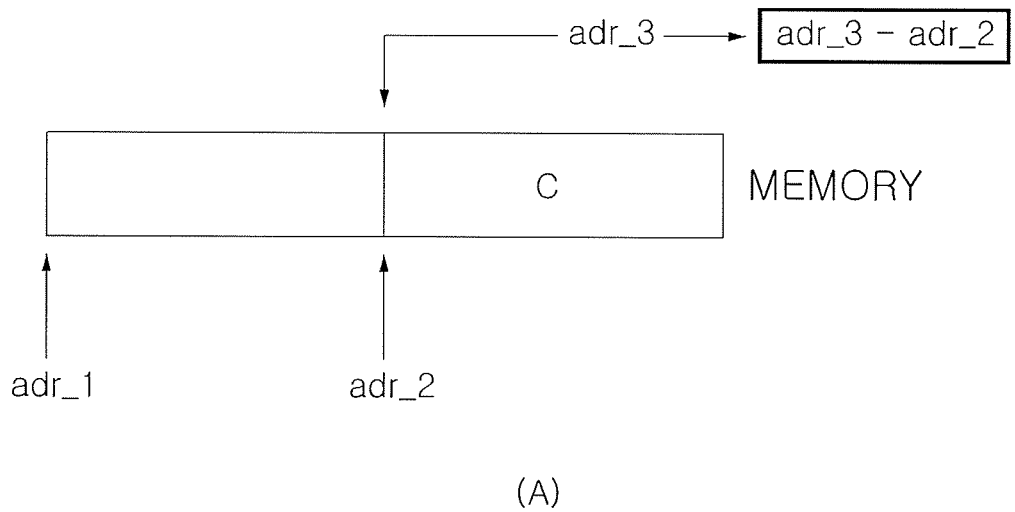
FIG. 4A is a conceptual view showing a method of offsetting addresses assigned by the window map.
FIG. 4B is a conceptual processing view showing a case where the window map indicates the same address region.
Figure 4:
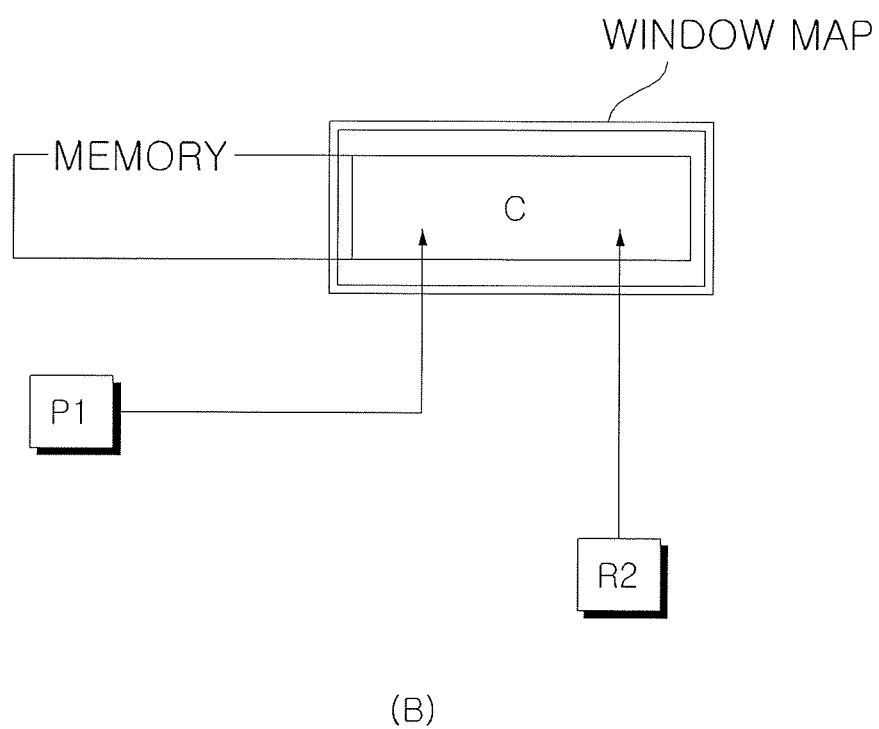

Thus, in the case where the address region of the memory is partitioned into plural regions, the start addresses of the partitioned regions become the start addresses of regions to be partitioned, which may cause a malfunction in a processing unit. FIG. 4 shows an example in which an address region is assigned to two processing units, an address range adr_1 to adr_2 is assigned to a first processing unit, and an address range following adr_3 is assigned to a second processing unit. Here, it is necessary to reset the start address of the memory address assigned to the second processing unit because the address adr_3 assigned to the second processing unit is not suitable for a processing unit. To this end, the address adr_3 assigned to the second processing unit is offset to the address "adr_3-adr_2" so that the start address of the second processing unit is reset.

FIG. 4B shows an example in which a window map designates the same address region. Referring to FIG. 4B, in the case where two or more processing units request a memory having the same operating speed and capacity, a window map may assign an address region C to a processing unit P1 and a processing unit P2 in common. The window map may present an address region, corresponding to a window map, to the processing unit P1 or the processing unit P2 which has first completed its task or may assign an address region to one of the two processing units according to the task processing priority. Here, the window map may be provided to the two processing units P1 and P2, and the two processing units P1 and P2 may divide time and operate together or may sequentially access a memory according to the task priority (or task request priority).

Figure 5:
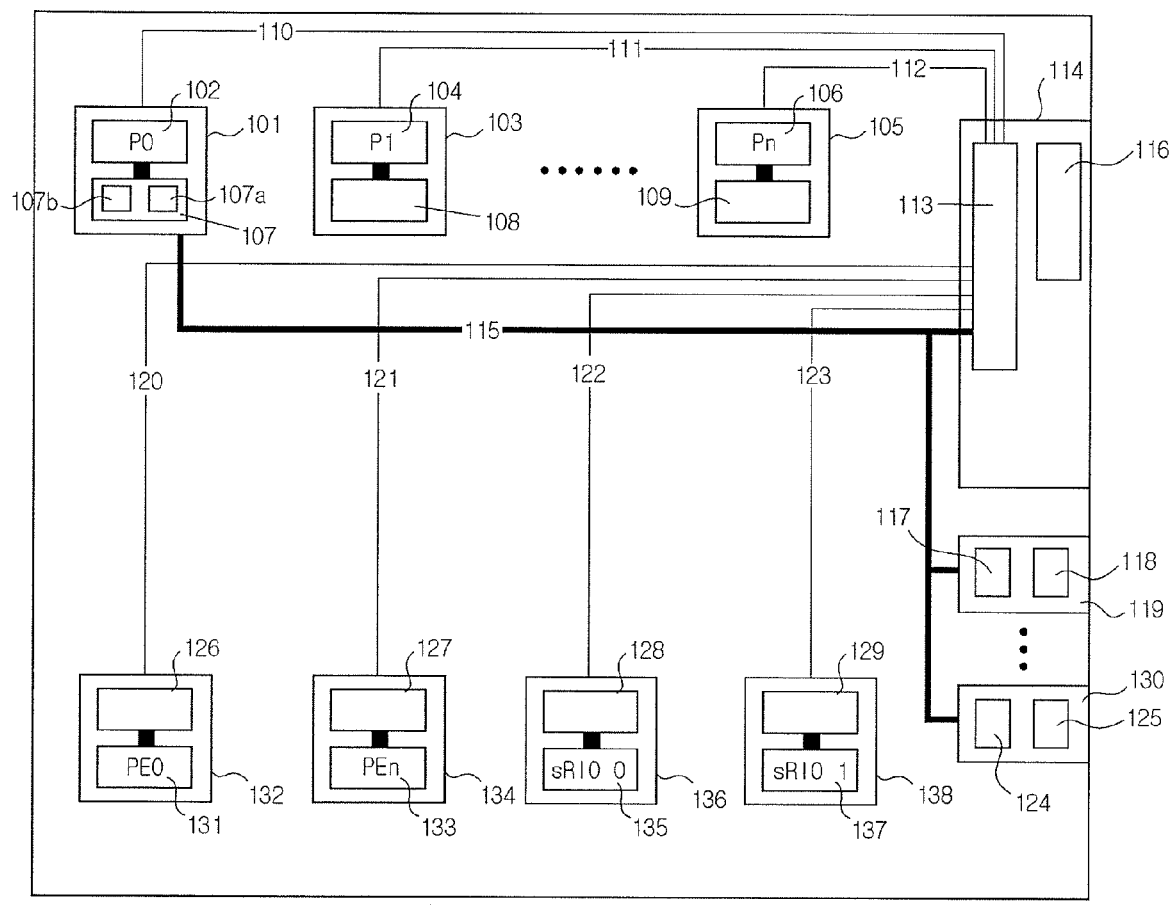
FIG. 5 is a diagram showing a memory control apparatus for a multi-processing unit according to an embodiment of the present invention.

FIG. 5 is a diagram showing a memory control apparatus for a multi-processing unit according to an embodiment of the present invention.

The memory control apparatus 100 includes first processing unit matching units 101, 103, and 105, the second processing unit matching units 132, 134, 136, 138, and memory matching units 114, 119, and 130, which are interconnected by a bus 115.

The first processing unit matching units 101, 103, and 105 and the memory matching units 114, 119, and 130 are coupled to control signals 110, 111, 112 for the transmission or reception of control signals, and the second processing unit matching unit 132, 134, 136, 138 and the memory matching units 114, 119, and 130 are also coupled to control signals 120 to 123 for the transmission or reception of control signals.

Processing units 102, 104, and 106 are respectively built in the first processing unit matching units 101, 103, and 105.

Although the processing units 102, 104, and 106 are respectively included in the first processing unit matching units 101, 103, and 105, the processing units 102, 104, and 106 may be placed outside the memory control apparatus 100 apart from the processing unit matching units 101, 103, and 105. It is illustrated that the embodiment includes the processing units, for description purposes and convenience of understanding, but the present invention is not limited to the above embodiment.

In the illustrated embodiment, the second processing unit matching units 132, 134, 136, and 138 arbitrate a memory which will be used by an external processing unit (not shown) connected thereto through an interface, such as PCI, PCI-Express, or sRIO, and may further include respective interface units 131, 133, 135, and 137 for performing a match for an external processing unit (not shown).

The processing unit matching units 101, 103, 105, 132, 134, 136, and 138 may include respective memory controllers 107, 108, 109, 126, 127, 128, and 129.

The memory controllers 107, 108, 109, 126, 127, 128, and 129 are placed in respective processing units one by one and are configured to include information about address ranges to be accessed by the respective processing units. The respective memory controllers (for example, the memory controller 107) includes an address assignment unit 107a and an address mapping unit 107b. The address assignment unit 107a partitions the address region of a memory and receives an assigned memory based on the information, and the address mapping unit 107b converts an address range, accessed by a processing unit, into an address range suitable for an access region of the processing unit as described above with reference to FIG. 4.

Although one memory controller 107 is illustrated for the processing unit 102, the same memory controller as the memory controller 107 is provided in the respective processing units 104 and 106.

Although not shown in the drawing, the processing unit matching units 101, 103, 105, 132, 134, 136, and 138 include respective buffers for the input or output of data. Accordingly, a difference in the processing speed for the input and output of data and asymmetry in the performance between the processing units 102, 104, and 106 can be reduced through the buffering function of the buffer.

Further, when the processing units 102, 104, and 106 write data into a memory or read data from a memory, the buffers make smooth the flow of data, and the address assignment unit 107a and the address mapping unit 107b determine an address region assigned to the processing unit 102 and write data into a corresponding address region or read data from a corresponding address region.

The memory matching units 114, 119, and 130 include respective memory interface units 116, 118, and 125 for the transmission or reception of data to or from external memories having an interface having the same standard or interfaces having different standards. The memory matching units 114, 119, and 130 process corresponding acknowledges when the processing units 102, 104, and 106 request to use a memory.

The memory matching units 114, 119, and 130 may further include respective arbitration and control logics 113, 117, and 124 configured to receive and process the control signals of the processing units 102, 104, and 106.

Figure 6:
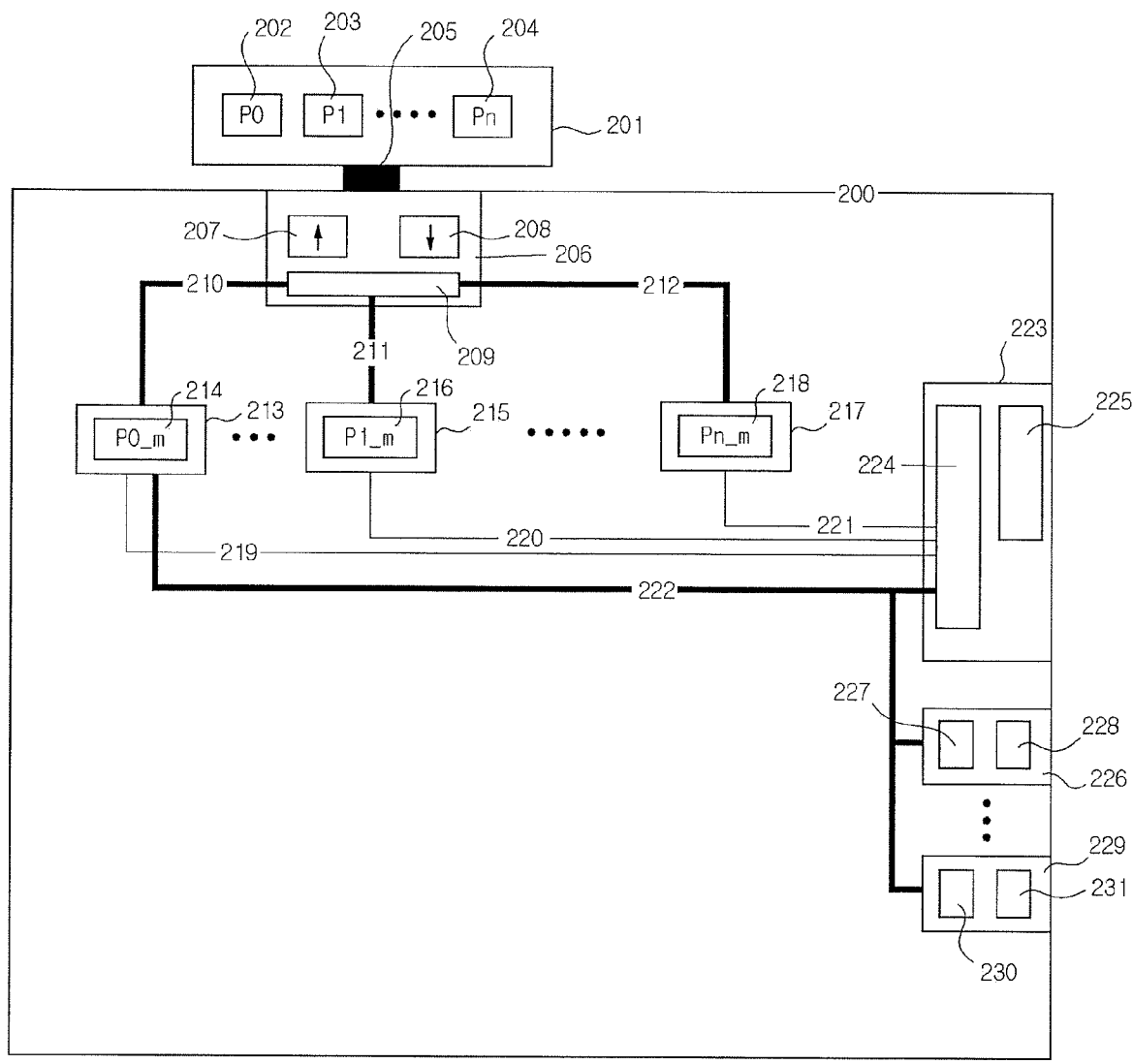
FIG. 6 is a conceptual block view showing another example of the memory control apparatus according to the present invention.

FIG. 6 is a conceptual block view showing another example of the memory control apparatus according to the present invention.

The memory control apparatus shown in FIG. 6 relates to an embodiment in which a memory control apparatus 200 and a processing unit 201 exist separately and the processing unit 201 and the memory control apparatus 200 are connected by an external bus 205.

A plurality of the processing units 201 forms a farm (201) form.

In this state, in order to assign an address region to respective processing units 202 to 204, it is necessary to assign the address range of a memory to the respective processing units 202 to 204, reset the respective assigned address ranges, and interface the respective processing units 202 to 204 and the memory. To this end, the memory control apparatus 200 includes processing unit matching units 213, 215, and 217 and an external processing unit matching unit 206. The processing unit matching units 213, 215, and 217 are configured to assign the addresses of the memory to the respective processing units and to match the assigned addresses to the respective processing units 202 to 204, and the external processing unit matching unit 206 is configured to connect the processing unit matching units 213, 215, and 217 and the processing unit 201.

The external processing unit matching unit 206 includes input and output buffers 207 and 208 and a mux/demux unit 209. The input and output buffers 207 and 208 are configured to buffer data of the processing units 202 to 204 input or output through an external bus, and the mux/demux unit 209 is configured to change the path of data so that data of the processing units 202 to 204 can be input or output through the processing unit matching units 213, 215, and 217 corresponding to the respective processing units 202 to 204.

The processing unit matching units 213, 215, and 217 exchange data with the mux/demux unit 209 of the external processing unit matching unit 206 through internal buses 210, 211, and 212 based on a peer to peer or shared bus method.

The processing units 202, 203, and 204 of the external processing farm 201 have unique IDs or classifiers and read or write data. Accordingly, the external processing unit matching unit 206 can transmit or receive data to or from the processing unit matching units 213, 215, and 217 corresponding to processing unit data.

Accordingly, the variable configuration for a memory map according to the present invention may also be applied to the external processing unit farm 201.

Memory controllers 214, 216, and 218, built in the respective processing unit matching units 213, 215, and 217, perform memory access through respective paths 219, 220, and 221 along which the memory controllers 214, 216, and 218 exchange control signals with the memory matching units 223, 226, and 229 and through a path 222 along which the memory controllers 214, 216, and 218 exchange internal data messages. The memory matching units 223, 226, and 229 include respective memory interface units 225, 228, and 231 and respective arbitration and control logics 224, 227, and 230 configured to process control signals.

Figure 7:
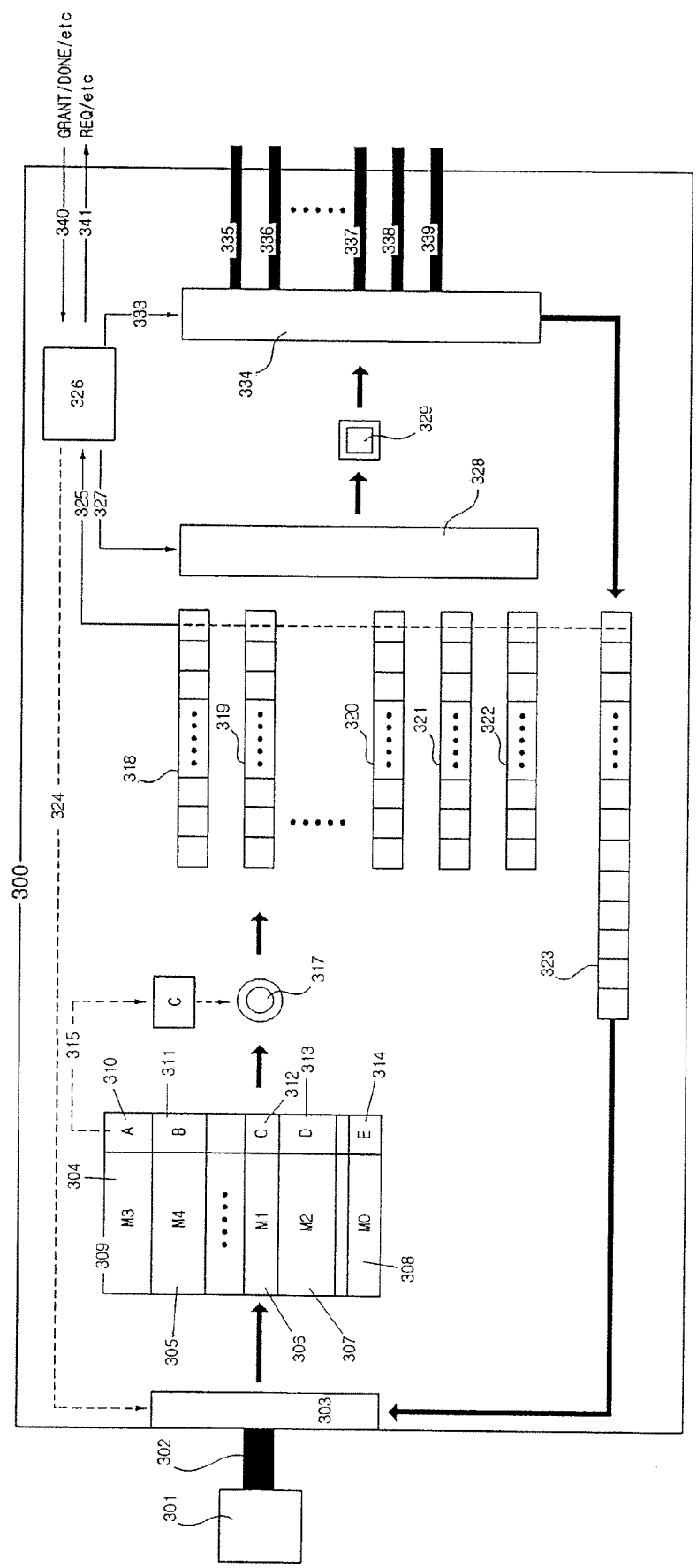
FIG. 7 is a conceptual block view showing an embodiment of a processing unit matching unit.

FIG. 7 is a conceptual block view showing an embodiment of the processing unit matching unit.

The processing unit matching unit 300 shown in FIG. 7 is connected to the memory control apparatus 100 and 200 shown in FIGS. 5 and 6. The processing unit matching unit 300 includes a processing unit 301, a bus 302, a processing unit bus matching unit 303, an address assignment unit 309, an address mapping unit 317, output buffer 318 to 322, an input buffer 323, a data selection unit 328, a last output buffer 329, a memory bus connection unit 334, and a memory access control unit 326. The bus 302 is configured to connect the processing unit 301 and the processing unit matching unit 300. The processing unit bus matching unit 303 converts a signal of the processing unit 301 so that the signal is suitable for the processing unit matching unit 300. The address assignment unit 309 is configured to search for a corresponding memory by checking the address of a processing unit and to find out information about the memory. The address mapping unit 317 is configured to include memory mapping addresses and to produce real memory addresses. The output buffers 318 to 322 are configured to buffer memory output data of the processing unit 301. The input buffer 323 is configured to buffer data received from data. The data selection unit 328 is configured to read data from the output buffers 318 to 322 to a selected memory. The memory bus connection unit 334 is configured to output data of the last output buffer 329 to a corresponding memory bus. The memory access control unit 326 is configured to control memory access while transmitting or exchanging a control signal, such as a request, acknowledge, termination, or stop for the use of a memory, with a memory matching unit, manage the input and output buffer within the processing unit matching unit 300, and control the connection configuration of an input and output bus toward a memory.

The processing unit the processing unit bus matching unit 303 is configured to convert a signal of the internal data bus of a memory switching device according to the bus 302 coupled to the processing unit 301, transfer address/control signals, received from the processing unit 301, to the address mapping unit 317, transmit memory acknowledge data received from an input buffer 323, through the bus 302, and control the flow of data under the control of the memory access control unit 326.

The address assignment unit 309 includes information about the entire memory map of the processing unit 301. The address assignment unit 309 includes information about a memory matching unit, the start addresses of memories, and contents 310 to 314 for information about mapped sizes every memory map blocks 304 to 308. Here, the contents are classified every memories coupled to the processing unit matching unit 300. Further, the address assignment unit 309 is configured to receive a memory address value from the processing unit bus matching unit 303, finds out a corresponding memory matching unit and a start address corresponding to the memory matching unit, and transfer them to the address mapping unit 317 through the internal transfer bus 315. A method of mapping a memory to the address assignment unit 309 may include, for example, a method of mapping the entire memory to the address assignment unit 309, a method of mapping only some of a memory to the address assignment unit 309, and a method of fragmenting a memory and mapping the memories to other positions of an address table.

The address mapping unit 317 is configured to receive information about a memory start address from the address assignment unit 309 and to convert the address of a processing unit so that the address is suitable for the address system of the corresponding memory based on the received information. In other words, the address mapping unit 317 is configured to convert an address value between the addressing system of a processing unit and the addressing system of a memory according to an addressing method. This is described below with reference to FIG. 4.

The output buffers 318 to 322 are configured to buffer information about a memory address, data, control, a processing unit, and an access sequence received from a processing unit in the form of a memory output message and outputs the information to a memory under the control of the data selection unit 328. The output buffers 318 to 322 are also configured to transfer the state (full, empty, almost full, almost empty, etc.) of a buffer to the memory access control unit 326 through the internal bus 324 (or the memory access control unit 326 reads the state. A method of configuring the output buffers 318 to 322 may include, for example, a method of placing a buffer on a memory basis, a method of grouping memories and placing a buffer on a group basis, and a method of placing one buffer.

The input buffer 323 is configured to buffer an acknowledge message, read data, data, etc., received from a memory, and transfers them to a processing unit. The message includes information about a processing unit, an access sequence, a memory, etc. In the same manner as the output buffers 318 to 322, the state of the input buffer 323 is also transferred to the memory access control unit 326 through the internal bus 324 or is read by the memory access control unit 326.

The data selection unit 328 is configured to select the output buffers 318 to 322, fetch an output memory message from a corresponding buffer, and transfer the memory message to the last output buffer 329 in response to a control signal 327 of the memory access control unit 326.

The memory bus connection unit 334 is configured to transfer the message of the last output buffer 329 to corresponding memory buses 335 to 339 in response to a control signal 333 of the memory access control unit 326. The memory bus connection unit 334 may also process a message so that the message is suitable for the memory buses 335 to 339 or convert the message in the form of data or a signal, if appropriate. Further, the memory bus connection unit 334 is configured to transfer data, received from the input memory bus to the input buffer 323 in response to a control signal 333 of the memory access control unit 326.

The memory access control unit 326 is configured to output a control signal 341, such as a memory access request or a data transmission stop request, to a memory matching unit, receive a control signal 340, such as memory use acknowledge, processing completion, or a data transmission stop, from a memory matching unit, receive state input (325) of the output buffers 318 to 322 and the input buffer 323, and perform the selection and control process 327 of the output buffers 318 to 322, the memory bus connection control process 334 of the memory bus connection unit 334, and the control of the processing unit bus matching unit 303.

Figure 8:
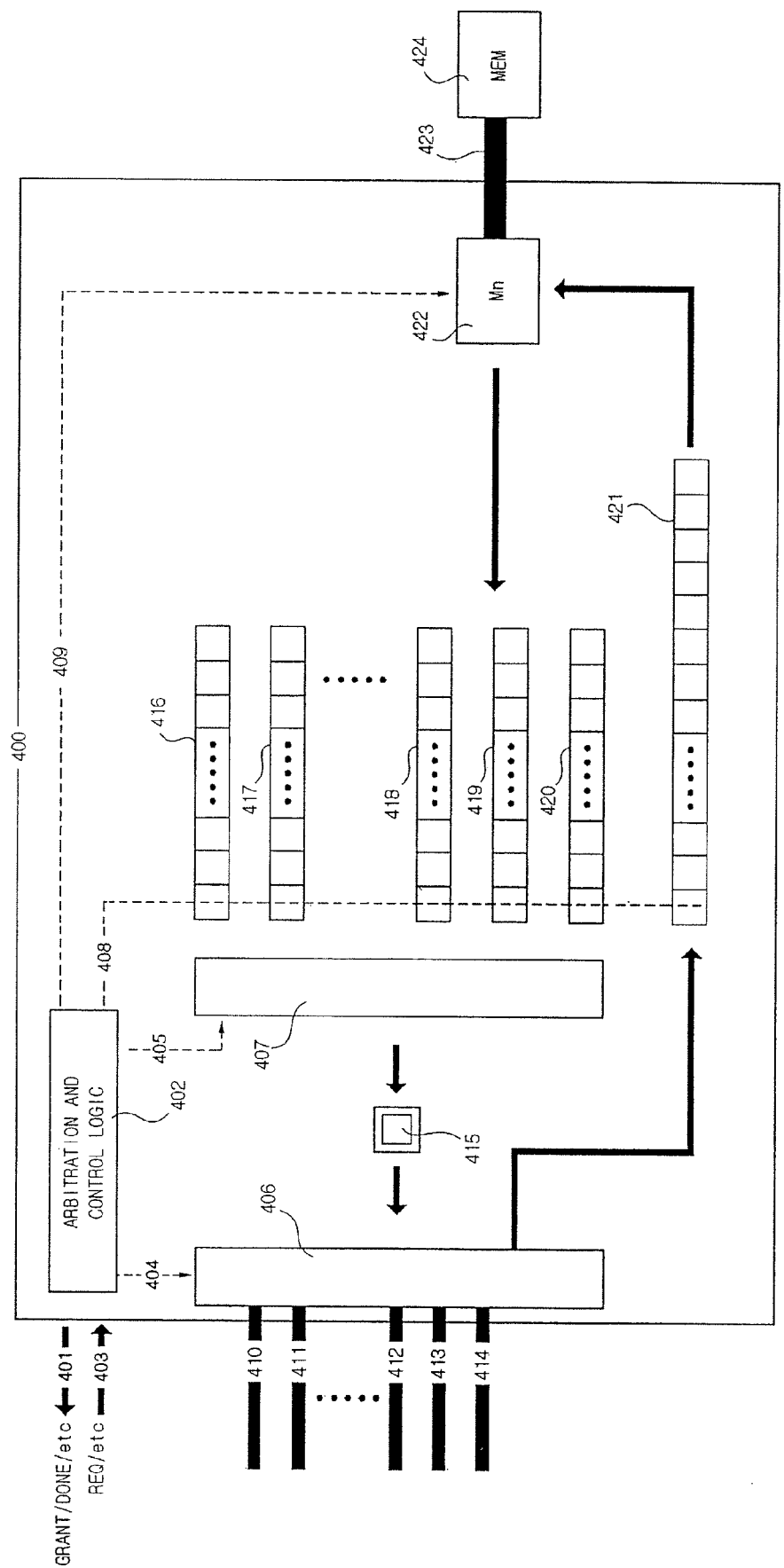
FIG. 8 is a diagram showing a data input/output method of a memory matching unit.

FIG. 8 is a diagram showing a data input/output method of the memory matching unit.

The memory matching unit 400 includes a memory bus matching unit 422, a memory connection bus 423 on the part of a memory 424, an output buffer 421, input buffers 416 to 420, a processing unit data selection unit 407, a last input buffer 415, a processing unit bus connection unit 406, and an arbitration and control logic 402. The memory bus matching unit 422 is configured to convert a signal so that the signal is suitable for the memory connection bus 423 and to input data, read from the memory 424, to corresponding buffers 416 to 420. The output buffer 421 is configured to buffer a memory output data message output by a processing unit. The input buffers 416 to 420 are configured to buffer input data received from the memory 424. The processing unit data selection unit 407 is configured to extract data from the input buffers 416 to 420 toward processing units. The processing unit bus connection unit 406 is configured to output data of the last input buffer to a corresponding processing unit bus. The arbitration and control logic 402 is configured to transmit, receive, or process control signals, such as a request, arbitration, acknowledge, completion, and stop, for the use of the processing unit matching unit 300 and the memory, control the access of a processing unit to the memory, manage the input and output buffers 416 to 421 within the memory matching unit 400, and control a connection configuration of an input and output bus toward a processing unit.

The memory bus matching unit 422 is configured to convert data input or output to or from the memory 424 into a signal of an internal data bus according to the format of the memory connection bus 423, fetch a memory access output message from the output buffer 421, send the fetched memory access output message to the memory 424, input information about an access sequence and a processing unit which has stored data, received from the memory 424, when the data is output according to memory access, to the input buffers 416 to 420 of a memory access request processing unit, control the flow of data in response to a control signal 409 of the arbitration and control logic 402, and changes setting.

The input buffers 416 to 420 are configured to buffer memory input data received from the memory, together with information about a processing unit and an access sequence, in the form of a memory input message, output them to the processing unit under the control of the processing unit data selection unit 407, and transfer the state (full, empty, almost full, or almost empty) of the buffer to the arbitration and control logic 402 through an internal bus 408 (or the state is read by the arbitration and control logic 402). A method of configuring the input buffers 416 to 420 may include, for example, a method of placing a buffer on a memory basis, a method of grouping memories and placing a buffer on a group basis, and a method of placing one buffer.

The output buffer 421 is configured to buffer memory read and write command messages received from processing units and transfer the command messages to the memory. The message includes information about a processing unit, an access sequence, and a memory. In the same manner as the input buffers 416 to 420, the state of the output buffer 421 is also transferred to the arbitration and control logic 402 through the internal bus 408 (or the state of the output buffer 421 may be read by the arbitration and control logic 402).

The processing unit data selection unit 407 is configured to select the input buffers 416 to 420 in response to a control signal 405 of the arbitration and control logic 402, fetch an input memory message from a corresponding buffer, and transfer the message to the last input buffer 415.

The processing unit bus connection unit 406 is configured to transfer messages, received from the last input buffer 415, to the corresponding processing unit buses 410 to 414, in response to a control signal 404 of the arbitration and control logic 402. Here, the processing unit bus connection unit 406 may convert the messages so that the messages are suitable for the processing unit buses 410 to 414 in the form of data or a signal.

The processing unit bus connection unit 406 is configured to receive data, received from an input processing unit bus, to the output buffer 421 in response to a control signal 404 of the arbitration and control logic 402.

The arbitration and control logic 402 is configured to receive a control signal 403, such as a memory access request or a data transmission stop request, from the processing unit matching unit 300, output a control signal 401, such as a memory use acknowledge, processing completion, or a data transmission stop request, to the processing unit matching unit, receive state information 408 of the input buffers 416 to 420 and the output buffer 421, perform the selection control 405 of the input buffers 416 to 420, and perform the processing unit bus connection control 404 of the processing unit bus connection unit 406 and the control of the memory bus matching unit 422.

The memory buses 335 to 339 of FIG. 7 and processing unit buses 410 to 414 of FIG. 8 may be configured in the form of a data bus between a single processing unit and a single memory, a data bus between one or more processing units and a single memory, a data bus between a single processing unit and one or more memories, or a data bus between one or more processing units and one or more memories. The distinguishment between a processing unit and a memory in a bus in which one or more processing units or memories are connected is possible by placing identifier buses for the processing unit and the memory (an in-band form included in a bus or an out-band form in which data is transmitted through separate buses).

Figures 9, 10:
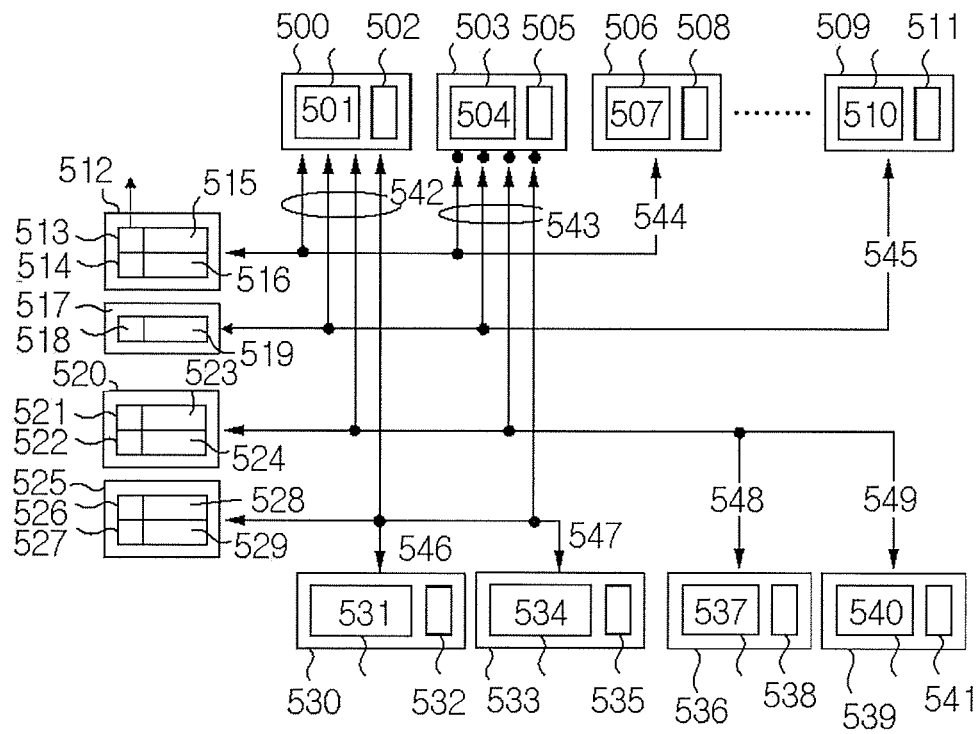
FIG. 9 is a diagram showing memory map reset memories for storing pieces of memory map information and a method of interconnecting them according to the present invention.
FIG. 10 shows an embodiment of a table including information about memory matching units and memory.

FIG. 9 is a diagram showing memory map reset memories for storing pieces of memory map information and a method of interconnecting them according to the present invention.

Memory map reset memories 512, 517, 520, and 525 are configured to store reset data of respective address tables 502, 505, 508, 511, 532, 535, 538, and 541 in respective processor matching units 500, 503, 506, 509, 530, 533, 536, and 539 and to fetch respective pieces of memory map information 515, 516, 519, 523, 524, 528, and 529 when a reset is requested. There are reset memory access buses 524 to 549 for accessing memory map reset data. The application of power and reset or a request for memory map reset of hardware and software initiates a reset for memory map information in the address tables 502, 505, 508, 511, 532, 535, 538, and 541 of the processors 501, 504, 507, 510, 531, 534, 537, and 540. When a request for memory map reset is generated, the processor matching units 500, 503, 506, 509, 530, 533, 536, and 539 fetch the respective pieces of memory map information 515, 516, 519, 523, 524, 528, and 529 within the memory map reset memories 512, 517, 520, and 525 through the reset memory access buses 524 to 549 and reset the memory maps of the respective address tables 502, 505, 508, 511, 532, 535, 538, and 541. When a request for a change of memory map reset data is generated by hardware or software, the processor matching units 500, 503, 506, 509, 530, 533, 536, and 539 change the respective pieces of memory map information 515, 516, 519, 523, 524, 528, and 529 within the memory map reset memories 512, 517, 520, and 525 through the reset memory access buses 524 to 549. The processor matching units 500, 503, 506, 509, 530, 533, 536, and 539 may access their memory map reset memories 512, 517, 520, and 525. The first and second booter processor matching units 500 and 503 to a separate memory map controller (not shown) may access all the memory map reset memory 512, 517, 520, 525 and change or reset the memory maps of respective processor matching units, if appropriate. The respective processor matching units 500, 503, 506, 509, 530, 533, 536, and 539 may have the memory map reset memories 512, 517, 520, and 525 used by the processor matching units only or may have memory map reset memories in a form in which one processor matching unit share a memory map reset memory with other processor matching unit.

Further, all processor matching units may share one memory. In the case where one or more processor matching units share one memory map reset memory, a method of adding processor IDs 513, 514, 518, 521, 522, 526, and 527 to the respective pieces of memory map information or a method of assigning memory map information region of a processor matching unit to a reserved space in order to distinguish the pieces of memory map information 515, 516, 519, 523, 524, 528, and 529. The respective memory map reset memories may exist in a fashion in which the memory map reset memory is built in the memory switching device 100 or 200, may be external to the memory switching device 1 or 200, or may exit in a form in which the two methods are combined. The first and second booter processor matching units 500 and 503 may check the contents of the address tables 502, 505, 508, 511, 532, 535, 538, and 541 of all the processor matching units, inform a corresponding processor matching unit of memory mapping out of the rules, if appropriate, and modify the contents. The first and second booter processor matching units 500 and 503 may set a specific region of a memory reset memory so that a specific memory is mapped to a specific address of a specific processor (for example, information about a processor number, memory information, address information, and whether a position is fixed may be left in other fields of the corresponding region).

FIG. 10 shows an embodiment of a table including information about the memory matching units and the memories.

The memory information table includes information about memories obtained through a reset process between the memory matching units 11 to 18 and the memories 37 to 44 of the memory switching device 100 or 200 and information generated during a memory access process. The processor matching units 2 to 10 access the memory information table and obtain information necessary to configure a memory map.

The memory information table includes a memory ID 601, a memory size 602, a speed 603, the number of connection links to a data width 604, access statistical information 605, the occurrence of error 606, and other information every memory matching unit 600. Since the memory information table includes the above information every memory matching units 608 to 612, The respective processor matching units 2 to 10 may configure a memory map optimized to operate a processor based on information about a memory type, a size, and a speed.

For example, the matching unit of a processor 0 may request a memory having the highest speed when a task has a specific size or more from a main memory, and the matching unit of a processor 1 may request a memory having a slow speed, but a sufficient capacity from a main memory. Further, when there is a request to place a Content Access Memory (CAM) in a specific address space for a fast processing of network packets, respective processor matching units may scan the characteristics of memories registered with the memory information table and map a memory suitable for its purpose in a desired place. The information of a memory information table may be changed (for example, information about a processor number, memory information, address information, and whether a place is fixed is left in other fields of the table) so that a specific memory can be mapped to a specific address of a specific processor according to a user' setting, if appropriate. The memory ID 601 is an identifier through which operating software can distinguish and recognize memories and may include a memory ID arbitrarily set by a user, an unique ID for a specific memory (for example, DDR2 400 MHz SAMSUMG→0x12340), or a memory ID designated by each memory manufacturer. The access statistical information 605 includes statistical information about memory access and may includes statistical values, such as the number of access on a processor basis to the number of access on a condition basis, the number of unconditional memory access. The other information 607 may include memory information necessary for operating software as well as standardized table information (for example, a memory fabrication year and vendor information). Specific column information of a table may be omitted so that it is suitable to operate a processor or may be replaced with other information, and a column may be added for additional information.

Figure 11:
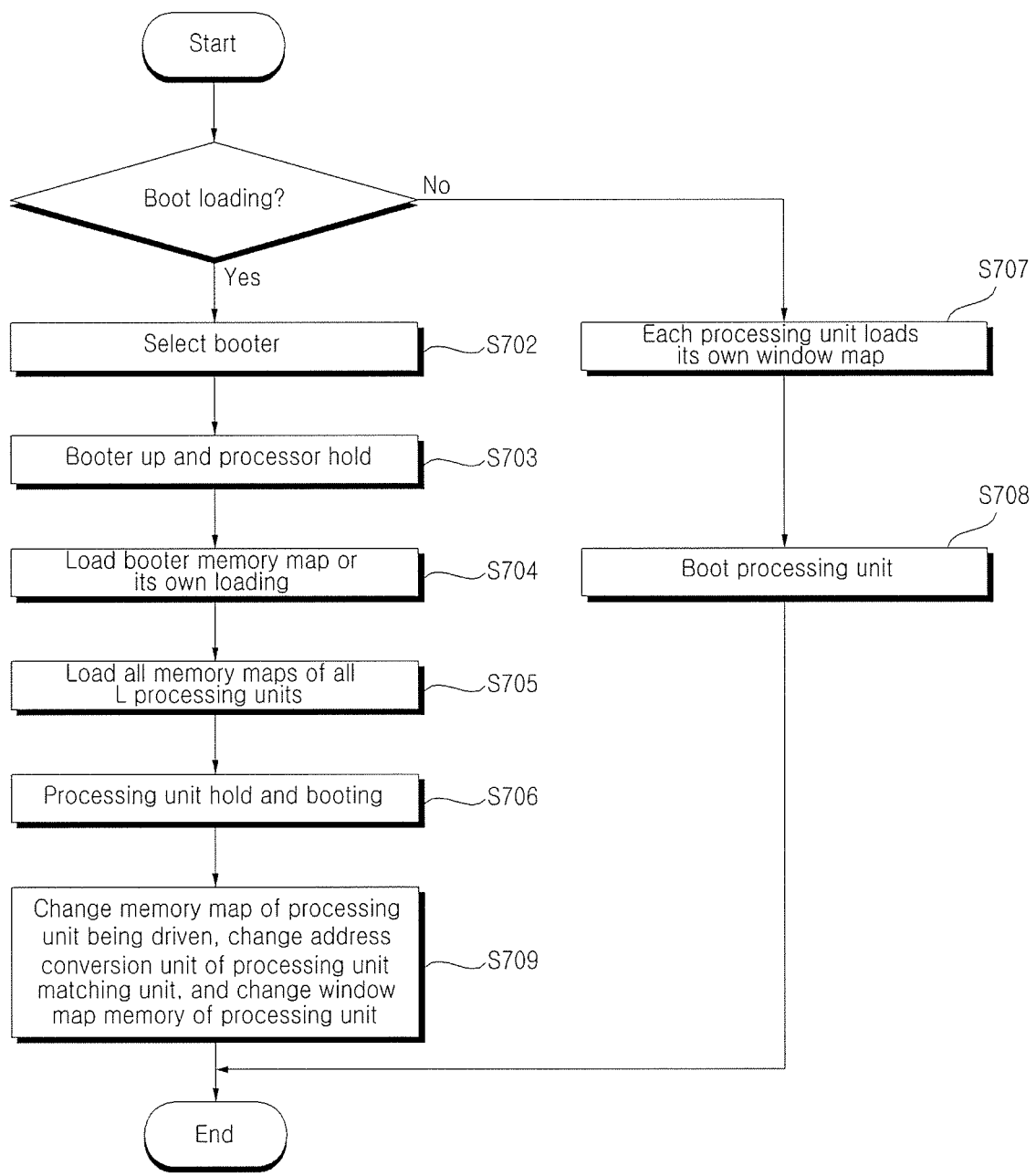
FIG. 11 is a flowchart illustrating an example in which a processing unit is reset in the memory mapping apparatus.

An embodiment of reset in the memory mapping apparatus configured as described above is described below with reference to the flowchart of FIG. 11. Although the flowchart of FIG. 11 and a description of the flowchart are presented step by step in order to help understanding, the respective steps of the flowchart may not be performed sequentially, and the sequence of the steps may be changed or the steps may be performed in parallel according to the type of information and the type of information.

When a memory map reset of a processor starts (S700), memory map data is fetched from the memory map reset memory. It is determined whether the memory map reset will be performed by a booter processor or each processor (S701). If, as a result of the determination, the memory map reset is determined to be performed by the booter processor, one of a first booter and a second booter which will perform the reset is selected (S702). The above selection is made according to a set value (for example, external jumper setting or internal register setting) of hardware or software. The selected booter becomes an up state and the remaining processors remains held (for example, using a method of not releasing the reset) (S703). The matching unit of the selected booter resets an address table based on memory map information fetched from its own memory map reset memory or a default value changed using an external jumper and performs a normal booting procedure (S704). The selected booter fetches corresponding memory map information from the memory map reset memories of other processors, together with its booting, and inputs the corresponding memory map information to each address table (S705). After the address tables of the processors are completed, the selected booter releases the processor hold and starts booting (S706). However, if, as a result of the determination at step S701, the memory map reset is determined to be performed by the respective processors, the processor fetches memory map information from its own memory map reset memory and fills the address table with the fetched memory map information (S707) and starts booting (S708). In the case where the respective processors changes the entire memory map while operating or changes part of the address table, the corresponding processor changes desired information using a method of directly accessing the address table or a method of changing its own memory map reset memory and newly loading a memory map (S709).

While the present invention has been shown and described in connection with the exemplary embodiments thereof, those skilled in the art will appreciate that the present invention may be changed and modified in various ways without departing from the spirit and scope of the present invention as defined in the following claims.

What is claimed is:

1. A memory mapping apparatus for a multi-processing unit, comprising:
at least one memory matching unit configured to perform matching between a plurality of processing units and a plurality of memories;
a memory controller configured to perform access control and arbitration for the respective memories;
a memory mapping unit configured to include a window map for the respective processing units, make correspond the memories to the respective processing units with reference to the window map, and assign part of the entire address region of the corresponding memory; and
a window map change unit configured to change a window map for a processing unit in which a request to use the memory has occurred in response to a request to use the memory from any one of the processing units, wherein the window map change unit is configured to change a type of a memory assigned to the respective processing units and an address range of the memory according to an operating speed of the respective processing units, a type of an application, and a memory capacity requested by the processing unit while the processing unit drives the application.

2. The memory mapping apparatus of claim 1, wherein the window map is provided on any one side of a Basic Input Output System (BIOS) of a system in which the respective processing units is placed, an operating system of a system in which the processing unit is placed, or a memory of a system in which the processing unit is placed.

3. The memory mapping apparatus of claim 2, wherein, in the case where the window map is placed in the operating system, the memory mapping unit loads the window map when the system boots up.

4. The memory mapping apparatus of claim 1, wherein the window map change unit is configured to extend an address range of a mapped window.

5. A memory mapping method for a multi-processing unit in a method of assigning memories to first and second processing units in a system comprising a first memory, a second memory, the first processing unit, and the second processing unit, the method comprising:
applying a window map for setting an access region of a memory to any one of the first memory and the second memory;
selecting any one of the first processing unit and the second processing unit, applying an access region set by the window map to a selected processing unit, and converting an address range of the access region into an address region accessible to the selected processor, wherein the selected processor is in an active state, and the other of the first and second processing units is in an inactive state, the memory mapping method further comprising assigning to the processing unit in the active state an address region assigned to the processing unit in the inactive state; and
matching a type of a memory and a capacity of a memory for at least one of the respective first processing unit and the second processing unit with reference to a reference table that includes information about a processing speed of the respective first processing unit and the second processing unit, a memory capacity consumed by a driver program, and a speed of a memory.

6. The memory mapping method of claim 5, wherein the window map is set with reference to an increased memory capacity requested by the processing task.

7. A memory mapping apparatus for a multi-processing unit in a memory mapping system connected to a plurality of memories, a first processing unit, and a second processing unit, the memory mapping apparatus comprising:
a window map storage unit configured to include a window map; and
a memory mapping unit configured to make correspond any one of the plurality of memories to the respective first processing unit and the second processing unit with reference to the window map and map an address region of a matched memory and extend an address range of a mapped window, wherein the first processing unit is in an active state, and the second processing unit is in an inactive state, the memory mapping unit assigning to the first processing unit an address region assigned to second processing unit,
wherein the memory mapping unit comprises a reference table for information about a processing speed of the respective first processing unit and the second processing unit, a memory capacity consumed by a driver program, and a speed of a memory and matches a type of a memory and a capacity of a memory for the respective first processing unit and the second processing unit with reference to the reference table.

8. The memory mapping apparatus of claim 7, wherein the memory mapping unit matches the first processing unit and the second processing unit for the same memory, partitions an address region of the same memory, and assigns the divided regions to the first processing unit and the second processing unit, respectively.

9. A memory mapping apparatus for a multi-processing unit in a memory mapping system connected to a plurality of memories, a first processing unit, and a second processing unit, the memory mapping apparatus comprising:
a window map storage unit configured to include a window map; and
a memory mapping unit configured to correspond any one of the plurality of memories to the respective first processing unit and the second processing unit with reference to the window map and map an address region of a matched memory and extend an address range of a mapped window, wherein the memory mapping unit comprises a reference table for information about a processing speed of the respective first processing unit and the second processing unit, a memory capacity consumed by a driver program, and a speed of a memory and matches a type of a memory and a capacity of a memory for the respective first processing unit and the second processing unit with reference to the reference table.

* * * * *